United States Patent [19]

Sepp

[11] Patent Number: 4,848,865
[45] Date of Patent: Jul. 18, 1989

[54] OPTICAL-FIBER REFERENCE-VALUE TRANSMITTER

[75] Inventor: Gunther Sepp, Ottobrunn, Fed. Rep. of Germany

[73] Assignee: Messterschmitt Bölkow Blohm GmbH, München, Fed. Rep. of Germany

[21] Appl. No.: 187,212

[22] Filed: Apr. 28, 1988

[30] Foreign Application Priority Data

May 26, 1987 [DE] Fed. Rep. of Germany ....... 3717687

[51] Int. Cl.⁴ .......................... G02B 6/02; H01J 5/16; H01J 40/14
[52] U.S. Cl. ................................ 350/96.29; 250/227; 250/231 R
[58] Field of Search .......................... 350/96.29, 96.30; 250/227, 231 R, 231 P

[56] References Cited

U.S. PATENT DOCUMENTS

| | | | |
|---|---|---|---|
| 3,596,104 | 2/1969 | Macohber | 350/96.29 X |
| 4,525,818 | 6/1985 | Cielo et al. | 350/96.29 X |
| 4,681,395 | 7/1987 | Lindsay et al. | 350/96.29 X |
| 4,697,876 | 8/1987 | Dyott | 350/96.29 |
| 4,778,248 | 8/1988 | Arzur et al. | 350/96.29 |
| 4,799,202 | 1/1989 | Assard | 350/96.29 X |

Primary Examiner—William L. Sikes
Assistant Examiner—Akm E. Ullah
Attorney, Agent, or Firm—Kenyon & Kenyon

[57] ABSTRACT

The optical-fiber reference-value transmitter comprises an optical waveguide coil with at least one winding layer, within which the sections of the optical waveguide fiber between adjacent turns are of equal length. A pressure finger which is connected to a mechanical distance pickup is guided over the layer of the winding and in the process exerts a mechanical pressure on a comparatively narrow zone of the optical waveguide fiber of a turn, whereby a so-called microbending effect is generated in the waveguide fiber. An opto-electronic transmitting and receiving apparatus which is connected to the optical waveguide fiber determines the location of the pressure point caused by the pressure finger and thereby, the position of the pressure finger.

11 Claims, 5 Drawing Sheets

OPTICAL-FIBER REFERENCE-VALUE TRANSMITTER

BACKGROUND OF THE INVENTION

Many designs of optical fiber sensors are known (Zeitschrift fuer Labortechnik, October 1980, pages 1083 to 1093, or "Laser und Optoelektronik", No. 1984, pages 17 to 29); these, however, are primarily suited for the highly accurate resolution of small distance or angle quantities to the extent that they are suited for distance or angle measurements.

On the other hand, reference-value transmitters are known, with which larger distances or angles are possible and in which the motion of a distance or angle pickup is converted into an electrical signal, for instance, according to the potentiometer principle.

Finally, optical methods for determining larger distances or distance changes are known, in which a light pulse is transmitted, is reflected by the object to be measured, and the reflected pulse is received again. The propagation time of the transmitted and reflected pulse is a measure for the distance from the reflecting object.

SUMMARY OF THE INVENTION

It is an object of the present invention to provide a reference-value (set-point) transmitter which determines accurately and over a large range, the position of mechanical parts such as flaps in aircraft which can operate in a sensor assembly, i.e., can be "multiplexed", and is not influenced by electromagnetic fields and dirt.

The above and other objects of the invention are achieved by an optical-fiber reference-value (set-point) transmitter, comprising an optical-fiber coil with at least one closely wound winding layer, within which the sections of the optical fiber between adjacent turns are of the same length, a pressure finger which is connected to a mechanical travel distance pick-up and can be guided over the winding layer and exerts a mechanical pressure on a comparatively short section of the optical fiber of a turn for generating a so-called microbending effect and an opto-electronic transmitting and receiving apparatus which is connected to the optical waveguide fiber and determines the location of the pressure point caused by the pressure finger and thereby, the position of the pressure finger.

The optical-fiber reference-value transmitter utilizes the property of optical waveguide fibers that in the event of heavy bending or point-wise pressure loading of the fiber, a so-called microbending effect takes place which has the effect that a part of the guided light is radiated or reflected in the region of the curvature. If a periodically point-wise pressure is applied a particularly pronounced "resonant" microbending effect takes place of a given length of period depending on the light guide design and light wavelength. In the reference-value transmitter according to the invention, the reflected part of the light is used to determine the position of the pressure point by means of an opto-electrical distance-measuring method, for instance, by means of a pulsed-laser distance measuring device. If now, as provided, the optical fiber is wound to form a coil and a pressure finger fastened to the distance measurement pickup exerts pressure along the coil axis on a short section of a turn, it is sufficient to measure the position of the pressure point, due to the always equal optical fiber sections from one turn to the next, only with an accuracy which corresponds to the length of the optical fiber from one possible pressure point to the next, i.e., it is only necessary to determine that turn, in which the pressure point and therefore the position of the pressure finger is located. Since the optical fibers have a very thin cross section and lie very closely next to each other in a coil, the resolution of the reference-value transmitter is nevertheless very high without the need for a distance measuring device with maximum accuracy. The diameter of such an optical fiber coil required for a given measuring accuracy can be reduced if the coil is made with n layers and the pressure finger pushes on one of the turns of the optical fiber conducted via a corresponding abutment.

In the fiber-optical reference-value transmitter according to the invention, it is possible to operate several reference-value transmitters with only one opto-electrical transmitting and receiving apparatus, if the individual reference value transmitters each have an address encoder corresponding to several closely adjacent pressure fingers, which impresses an individual microbending pattern to several adjacent turns at the end of the coil. The individual reference value transmitters can therefore be recognized by evaluation of the optical signals generated thereby, i.e., their addresses.

BRIEF DESCRIPTION OF THE DRAWINGS

The invention will be described in greater detail in the following, making reference to the embodiment shown, partially schematically, in the figures wherein.

DETAILED DESCRIPTION

Figure 1:
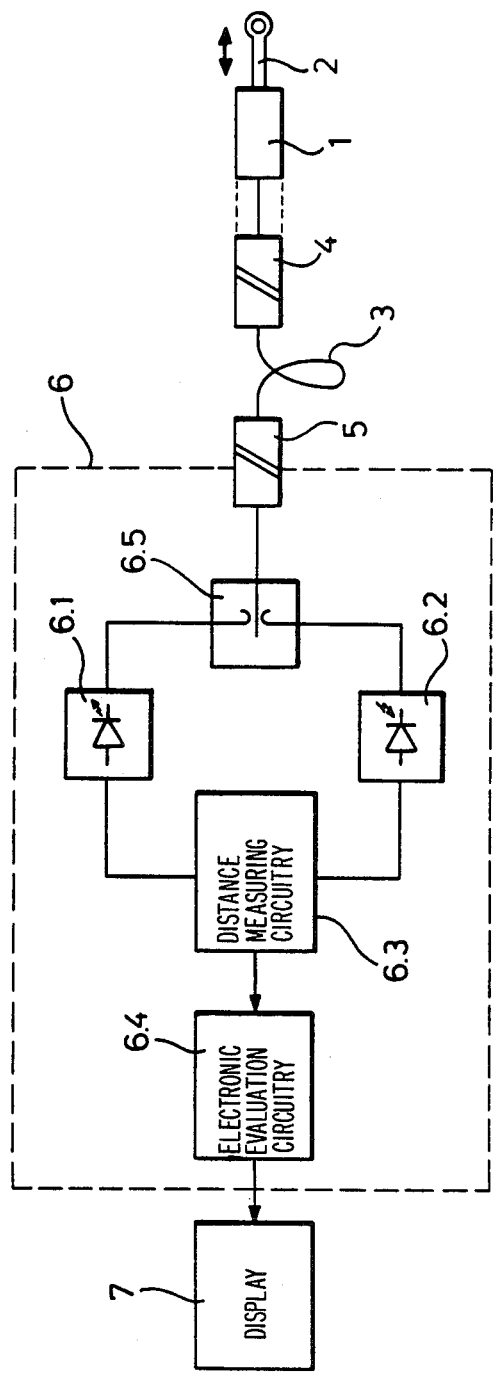
FIG. 1 shows the schematic design of an optical-fiber reference-value transmitter with the associated evaluation device.

In the arrangement shown in FIG. 1, an optical-fiber sensor 1 which has a mechanical distance pickup 2 is connected via a light waveguide connection 3 with corresponding plugs 4 and 5 to an evaluation apparatus 6. The plug 4 can also be arranged directly at the reference value transmitter 1. The evaluation device contains essentially an opto-electrical transmitter 6.1, for instance, a laser diode, as well as an opto-electrical receiver 6.2, for instance, a photo diode which are electrically connected to electronics distance measuring evaluation circuits 6.3 and 6.4. The optical coupling of the transmitter 6.1 and receiver 6.2 to the light guide connection 3 and therefore to the sensor 1 is accomplished via a coupler 6.5. The distance measuring circuitry 6.3 determines the "echo", generated by microbending, of the laser light sent into the optical fiber and thereby the distance of the pressure finger of the respective reference-value transmitter 1. The electronic evaluation circuitry 6.4 correlates this echo to the measurement value of interest, i.e., to the reference value of this given reference value transmitter 1. The position state of the distance pickup 2 determined by the evaluation device 6 is shown on a display 7.

Figure 2A:
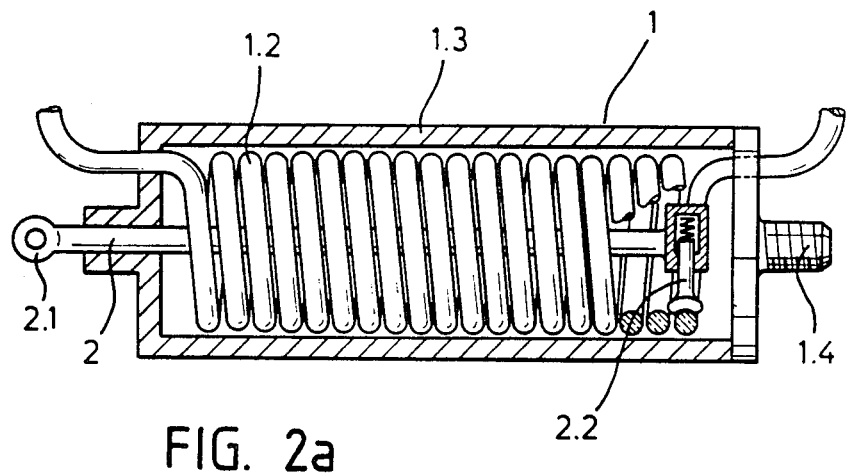
FIGS. 2a to d show the design of an optical fiber reference value transmitter in three longitudinal sections and a cross section of different embodiments.
Figure 2B:
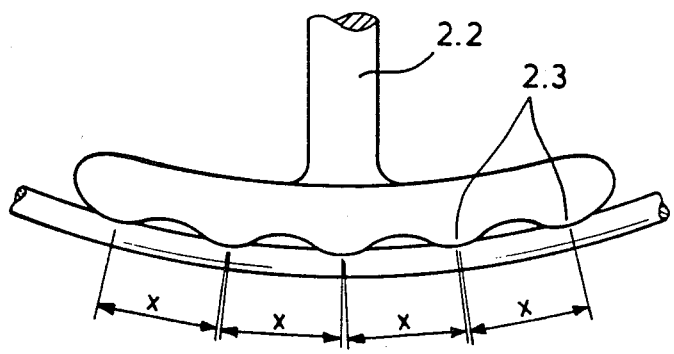
Figure 2C:
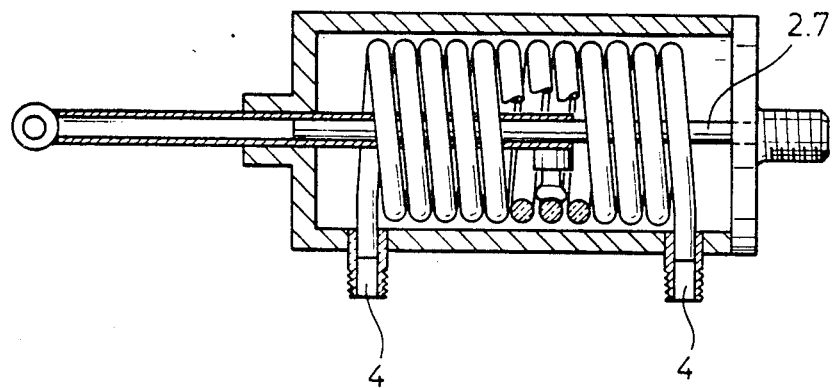

The optical-fiber reference-value transmitter 1, shown in FIG. 2a, comprises an optical-fiber coil 1.2, the single-layer winding of which consists of equal-sized closely adjacent turns of a lightwave guide with a fiber diameter of about 125 um. The optical-fiber coil 1.2 is surrounded by a housing 1.3 which has a fastening device 1.4. Coaxially with the optical-fiber coil 1.3, a rod 2 is guided in the interior of the housing and serves as a distance pickup and has suitable fastening parts 2.1 at the outer end. The rod 2 carries at the inner end a spring-loaded pressure finger 2.2 which pushes in the radial direction on a relatively short section of the turn of the optical fiber coil 1.2. In the event of an axial-displacement of the rod 2, the pressure finger 2.2 is thus guided from one turn to another and thereby causes the microbending effect in always equal length sections of the optical fiber and thereby, an echo depending on the reference value. For amplifying this echo without major contact pressure of the pressure finger 2.2, the latter is provided, according to FIG. 2b, with more than only one pressure point 2.3. The spacings x of these pressure points along the optical fiber are equal and are tuned in a manner known per se to the wavelength and optical fiber design in such a manner that the so-called resonant microbending effect occurs. A typical spacing is about x=2 mm. The contact pressure becomes particularly uniform if, according to FIG. 2c, the rod 2 is hollow and is additionally guided by an inner rod 2.7 which is fastened to the other end of the housing 1.3.

Figure 3A:
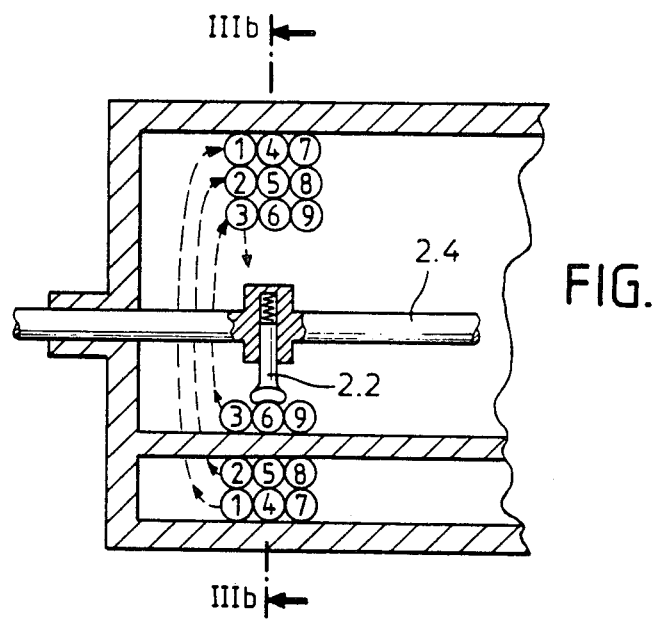
FIGS. 3a to b show respectively, a longitudinal section and a cross section along lines IIIb of FIG. 3a through a multi-layer optical fiber coil.
Figure 3B:
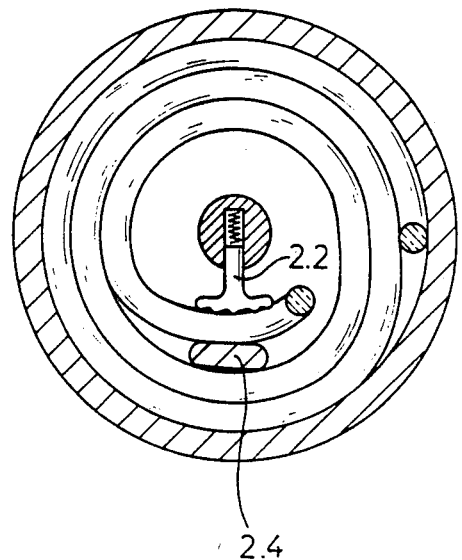

In order to increase the section length between two pressure points which the pressure finger 2.2 traverses in the transition from one turn to the next one, the optical fiber coil can also be wound with several layers according to the principle shown in FIGS. 3a and 3b. As can be seen from the consecutively numbered turns, for instance, always three turns are wound in this case in the radial direction on top of each other, i.e., spirally until the axial offset to the next turn takes place helically. The innermost layer is brought over a plate 2.4 acting as an abutment for the pressure finger 2.2. Thereby, the optical path distance between two adjacent inner turns is approximately tripled as compared to the example shown in FIG. 2a. The role of the pressure points 2.3 and the housing 1.3 and the abutment 2.4 can also be reversed, i.e., the pressure finger 2.2 can be made smooth and the housing 1.3 or the abutment 2.4 with convex line-shaped elevations in the longitudinal direction of the coil, acting as pressure points 2.3.

Figure 2D:
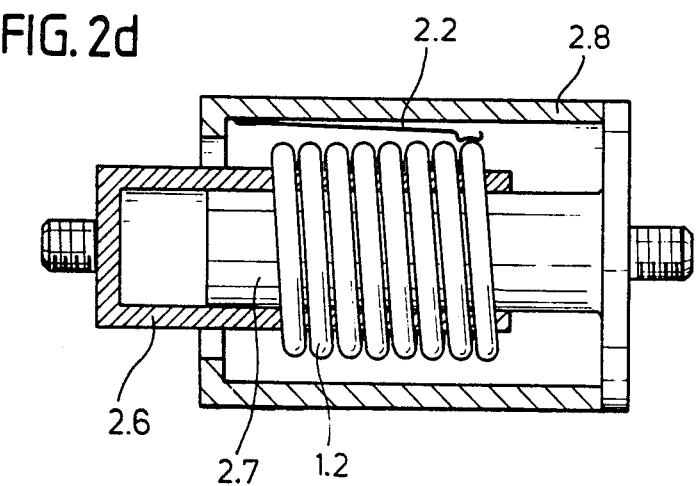

Likewise, the role of the pressure finger 2.2 and the housing 1 3 or the abutment 2.4, respectively, can be reversed FIG. 2d shows a reference-value transmitter 1 in which the optical fiber coil 1.2 is wound on a coil form 2.6 which is again guided by a rod or a cylinder 2.7. The pressure finger is now formed by a spring 2.2 fastened to the outer housing 2.8. This facilitates the manufacture of the reference value transmitter 1 at the expense of compactness.

In order to measure, in another embodiment, not shown, a rotary motion instead of a linear motion, the optical-fiber coil 1.2 is made toroidal and the pressure finger 2.2 is moved, analogously to the straight-line embodiment according to FIG. 2d on the outside in a circular track concentric therewith.

Figure 5A:
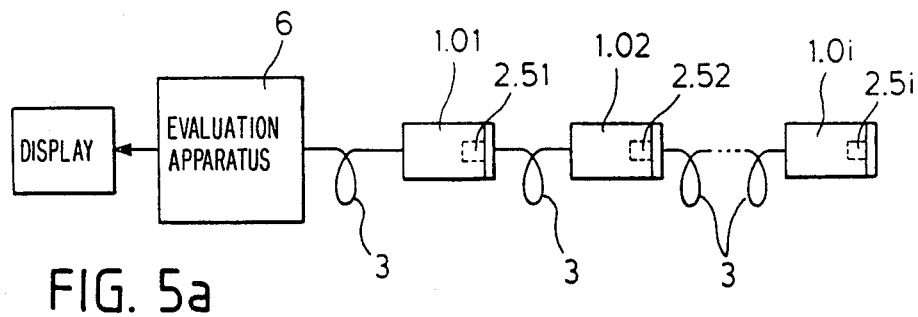
FIGS. 5a to b show a series and a parallel arrangement of several optical fiber reference-value transmitters with an evaluation device.

By microbending the pressure finger 2.2, part of the laser light sent into the optical fiber is converted into an echo and scattered radiation. According to the invention, several reference transmitters (1.01, 1.02, . . . 1.0i) can therefore be connected in series (FIG. 5a) if both ends of the optical fiber are brought out from the sensor, where the electronic distance measuring circuitry 6.3 determines the echoes generated by the passing laser light at the respectively next pressure point. With known optical fiber lengths of the individual reference-value transmitters 1 as well as the light guides 3 connecting them, or by a calibration measurement, the electronic evaluation circuitry 6.4 can be related to individual echoes and to the pressure fingers 2.2 of the individual reference value transmitters and can feed their reference values jointly to the display 7.

Figure 4:
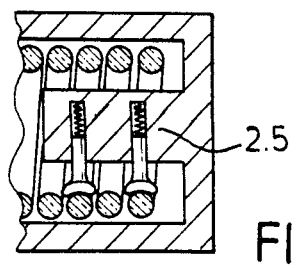
FIG. 4 shows an end of the optical fiber coil of a reference value transmitter with a binary address encoder.
Figure 6:
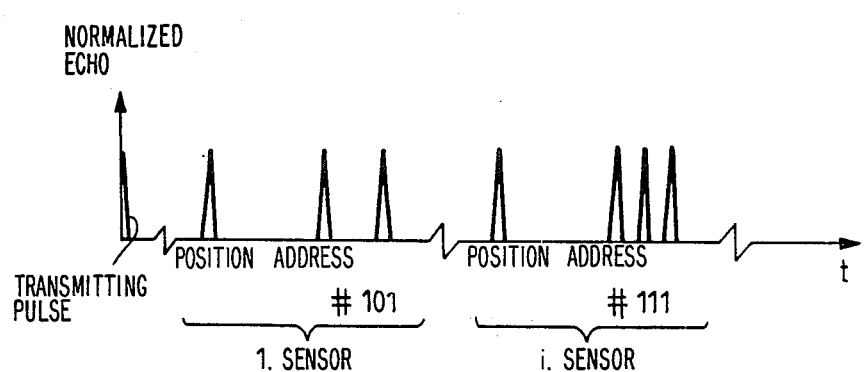
FIG. 6 shows an echo pulse sequence in an arrangement according to FIG. 5.

According to the invention, this multiplex method which is extremely important in practice, is further simplified by the fact that the individual reference-value transmitters are provided, so to speak, with an individual address so that the evaluation equipment recognizes each individual reference value transmitter without calibration or measurement of waveguide lengths. To this end a device 2.5 which acts as an address encoder and consists of several pressure fingers of the described type is arranged at one end of each optical fiber coil 1.2 according to FIG. 4. The latter are permanently adjusted once to a few turns of the optical fiber coil, for instance, as in the tumblers of a key lock. The electronic distance-measuring circuitry 6.3 ascertains the echoes generated thereby and the electronic evaluation circuitry 6.4 interprets them as a binary sequence of "0" and "1" (FIG. 6) which corresponds to the smallest possible units, i.e., one or n turns and thereby as the "address" of the thus identified reference value transmitter 1. The "distance" of this address forms at the same time a reference for the pressure finger 3.2 which can be adjusted for the measurement ("null" of the measuring scale). With a permanently wired sensor assembly, the always equal distance of the respective address encoders 2.5 can be used for checking the distance measurement and thereby, the reference value measurements.

Figure 5B:
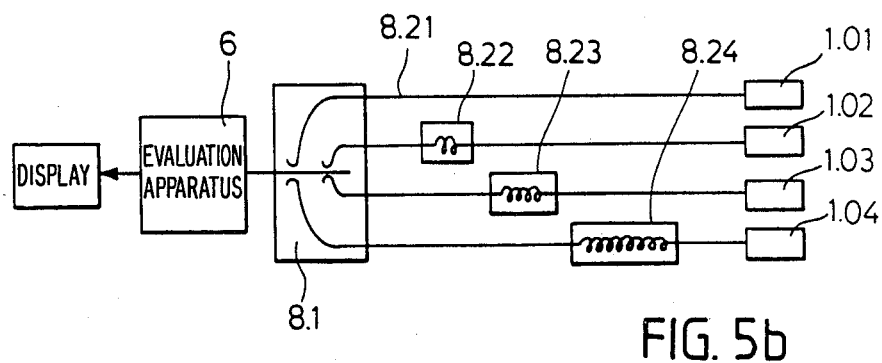

The individual reference value transmitters 1.01 to 1.04 can also be used in a parallel circuit by means of a Y-coupler 8.1 (FIG. 5b). In order to keep the echoes of the individual sensors apart a feedline 8.2i of sufficient, but different length, for instance in the form of a delay coil 8.22 to 8.24 is assigned to each reference value transmitter 1, so that an "echo image" according to FIG. 6 is obtained again.

For measuring the distance, a pulsed laser distance measuring device is preferably used. If the sensor multiplex is dispensed with, a CW laser distance measuring device with its known advantages (low cost, high measuring accuracy) can be used.

Thereby, a precisely measuring sensor assembly which consists completely of insulating materials is created, in which the light required for the measurement is completely enclosed in light waveguides and thus, contamination as well as electromagnetic interference are precluded.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An optical-fiber reference-value (set-point) transmitter, comprising an optical-fiber coil having at least one closely wound winding layer, within which the sections of the optical fiber between adjacent turns are of the same length, pressure finger means coupled to a mechanical travel distance pickup and guided over the winding layer for exerting a mechanical pressure on a comparatively short section of the optical fiber of a turn for generating a microbending effect and further comprising opto-electronic transmitting and receiving means coupled to the optical fiber for determining the location of the pressure point caused by the pressure finger means and thereby, the position of the pressure finger means.

2. The reference-value transmitter recited in claim 1, wherein, at one end of the optical fiber coil, a device comprising one or more permanently adjusted pressure fingers is arranged which push on one or more turns of the optical fiber and thereby impress on the optical fiber a defined microbending pattern.

3. The reference-value transmitter recited in claim 1 wherein the optical fiber coil is designed with n layers and the pressure finger means pushes on one turn of the respective $n^{th}$ layer conducted over an abutment where n is an integer.

4. The reference value transmitter recited in claim 1, wherein the pressure finger means pushes on part of a turn of the optical fiber at several closely adjacent pressure points, the spacing of which is tuned to the resonant microbending.

5. The reference-value transmitter recited in claim 1, wherein the optical-fiber coil is cylindrical and the pressure finger means can be moved coaxially to the cylinder axis.

6. The reference-value transmitter recited in claim 1, wherein the optical fiber coil is toroidal and the pressure finger means can be moved on a concentric circular track.

7. The reference-value transmitter recited in claim 1, wherein the opto-electrical transmitting and receiving means comprises a laser distance measurement device having a distance measuring error smaller than the length of the optical fiber between two adjacent possible positions of the pressure finger means.

8. The reference-value transmitter recited in claim 1, wherein the opto-electrical transmitting and receiving means comprises a pulsed-laser distance measuring device.

9. The reference-value transmitter recited in claim 1, wherein the opto-electrical transmitting and receiving means comprises a CW distance-measuring device operating in accordance with a phase measuring method, and the optical-fiber coil is terminated with a light absorber.

10. The reference-value transmitter recited in claim 1, wherein the optical fiber coils of several reference value transmitters are connected to each other in the manner of a series circuit.

11. The reference-value transmitter recited in claim 1, wherein the optical fiber coils of several reference-value transmitters are connected to each other in the manner of a parallel circuit and each optical-fiber coil is preceded by an optical delay section.

* * * * *